UNITED STATES PATENT OFFICE.

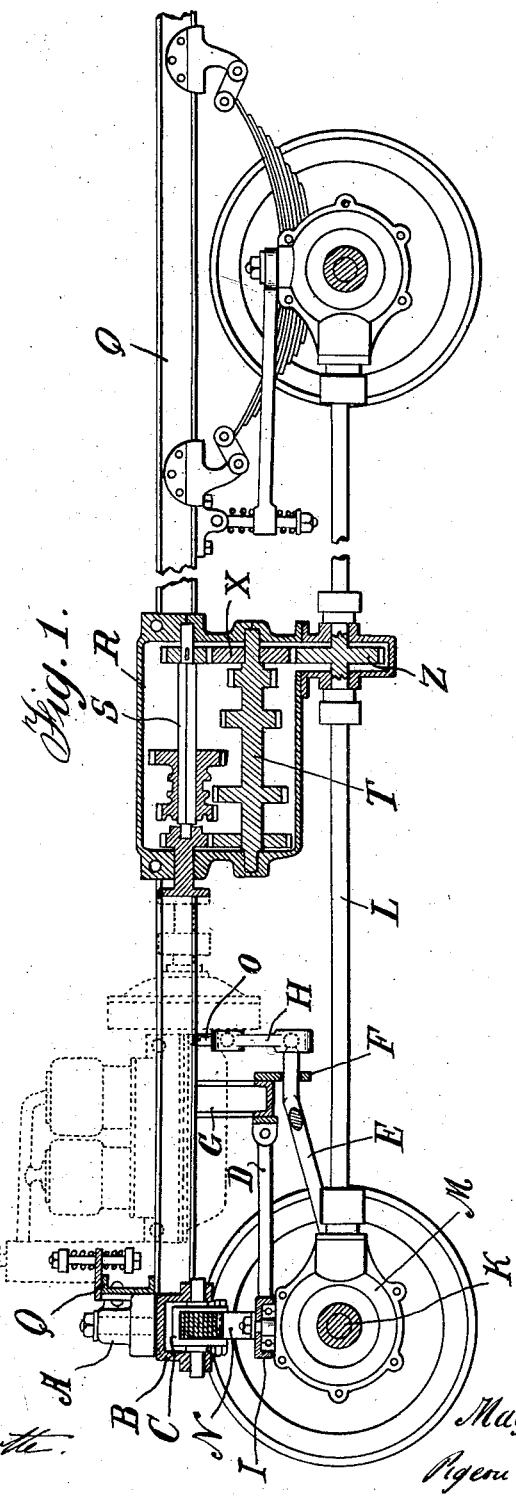

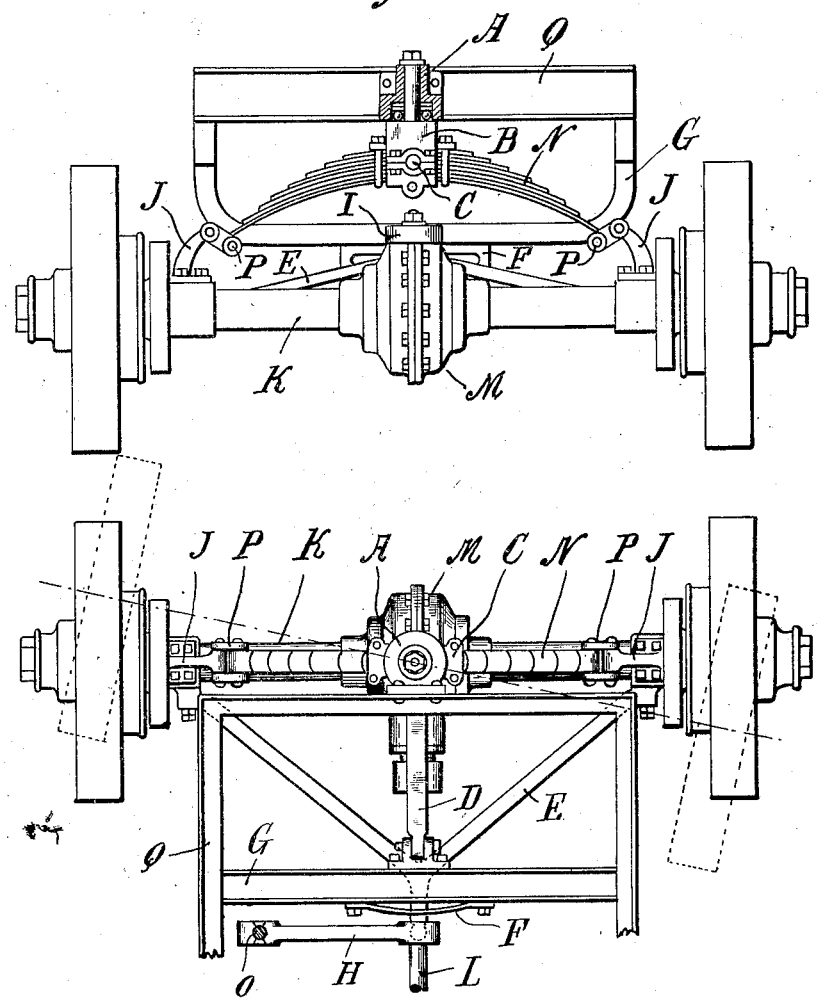

MAGNODEIX LÉONARD, OF MONTREAL, QUEBEC, CANADA.

AUTOMOBILE DRIVING AND STEERING MECHANISM.

1,097,807.      Specification of Letters Patent.      Patented May 26, 1914.

Application filed March 15, 1913. Serial No. 754,466.

*To all whom it may concern:*

Be it known that I, MAGNODEIX LÉONARD, a citizen of the French Republic, residing in the city of Montreal, in the county of Hochelaga, in the Province of Quebec, in the Dominion of Canada, having invented certain Improvements in an Automobile Driving and Steering Mechanism, do hereby declare that the following is a full, clear, and exact description of the same.

The invention is an improved automobile driving and steering mechanism, particularly adapted for use on motor trucks, the objects being to secure greater flexibility over rough roads without loss of power and to enable the truck to be turned in a smaller space.

Briefly the invention consists of a longitudinally disposed continuous shaft operatively connected at its ends to drive both front and rear axles, a suitable drive being taken from the engine drive shaft to an intermediate point of said continuous shaft, while the front axle is pivotally mounted to turn horizontally with the wheels in the manner of an ordinary wagon axle, provision being made for maintaining the drive while said axle is turned.

The invention will be better understood with the aid of the accompanying drawings, in which—

Figure 1 is a longitudinal vertical section through the truck. Fig. 2 is a front elevation partly in section. Fig. 3 is a plan view of the front portion of the truck with the engine removed.

Referring to the drawings Q is the truck frame having a cup bearing A rigidly secured centrally on its front edge and B is a forked bracket having a spindle journaled in said bearing and secured therein with a suitable nut at the top, ball bearings being suitably interposed between the two parts.

C is a recessed block rigidly secured to the center of the laminated spring N, said block having stub-shaft extensions journaled in the forked part of the bracket B at right angles to the journaling of said bracket B.

K is the front axle having the road wheels mounted on the ends thereof in the usual manner of driving wheels, J, J, are short brackets extending upwardly and rigidly secured, one toward each end, to the axle K, and pivotally connected at P to the ends of the spring N.

It might be here mentioned that the rear wheels of the truck are connected to the frame Q in any known manner as that part forms no part of the present invention, further the engine is also supported by the front portion of the frame, as also is the gear box R, but according to this invention, the engine drive shaft is not connected directly to the rear driving wheels, it being mounted at a higher elevation.

M is the driving gear of the front axle arranged in the center thereof in alinement with and below the forked bracket B, and coupled to the rear axle driving gear by the continuous shaft L, which has universal joints suitably arranged therein.

G is a U shaped beam rigidly connected at its ends to the sides of the frame Q and depending below the engine.

D is a strut or brace extending forwardly from the lowest and central point, in said U shaped beam G to the top of the box of the front axle driving gear M, being horizontally pivoted at its rear end to said beam G, and vertically pivoted at I to the top of said gear box, thus firmly holding the front axle to said beam G, while permitting of the various vertical and horizontal movements of the front axle in relation to the frame Q.

E is a Y shaped member rigidly connected at its two forward ends to the axle K, adjacent to the brackets J respectively, the rear branch of said member extending through a guide F and being connected by a ball joint at its end to an arm H, which in turn is connected at its other end by a ball joint to the operating lever O rigidly connected to the bottom of the steering post. In this arrangement it will be seen that the turning of the steering post oscillates the lever O, pushes longitudinally the arm H and thereby throws the member E, and consequently the front wheels, to right or left of the direction of travel as required.

S is the upper shaft of the transmission gear disposed in alinement with and coupled to the rear end of the engine shaft, and T is the lower shaft of the transmission gear, said transmission gear being of any well known type.

Z is a gear rigidly mounted on the shaft L, and coupled, through the medium of an idler X on the shaft T, to a gear fixedly mounted on the outer end of the shaft S, thus providing for a drive to the shaft L and consequently the front and rear axles, from the engine shaft.

The type of drive gears used between the shaft L and the front and rear axles is not shown in the drawings because it forms no part of the present invention, there being many well known and useful arrangements, but it may be here mentioned that the front driving gear must be one which will allow of the rotation and horizontal twisting or turning of the front axle, while maintaining the drive.

The arrangement herein described gives great flexibility while permitting the driving of the vehicle over very rough roads, particularly so in regard to the front axle which, through bracket B is permitted to turn in the manner of a wagon axle and through the pivoted block C, to rock vertically over rough roads, the necessary resilience being given by the spring N, while more or less rigidity and firmness is secured by the brace D, with its pivotal connections.

A further feature of the present invention is that with very little change such as the removal of a gear or pinion, the front or rear axle may be disconnected from the drive and the drive maintained on the other axle.

It is obvious that modifications or additions may be made in the details herein described and shown in the drawings, and I reserve the right to make such changes or additions so long as I do not depart from the invention as claimed in the following claim for novelty.

What I claim as my invention is:—

In an automobile driving and steering mechanism, the combination with the frame and rear wheels and axle, of a rotatable front axle, a vertical pivot arranged at the front end of said frame, a bowed spring centrally connected by a horizontal pivot to said vertical pivot and at its ends to the front axle, a bracing member flexibly connecting said front axle to a downward extension of the frame, steering arms extending rearwardly from said axle, means for horizontally swinging said steering arms from the steering post, and means for rotating said front axle.

Signed at the city of Montreal, in Canada, this 21st day of February, 1913.

MAGNODEIX LÉONARD.

Witnesses:
L. LETELLIER,
R. JEANNOTTE.

Copies of this patent may be obtained for five cents each, by addressing the "Commissioner of Patents, Washington, D. C."